May 13, 1930.　　　C. A. NIELSEN　　　1,757,974
CULTIVATOR STEERING ATTACHMENT
Filed March 20, 1926　　　2 Sheets-Sheet 1
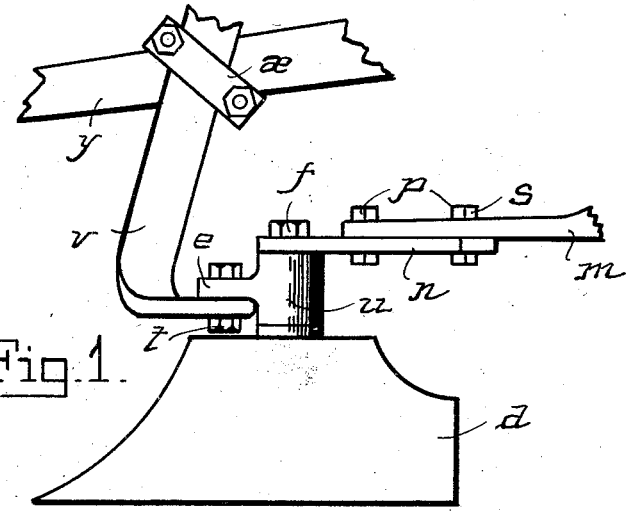
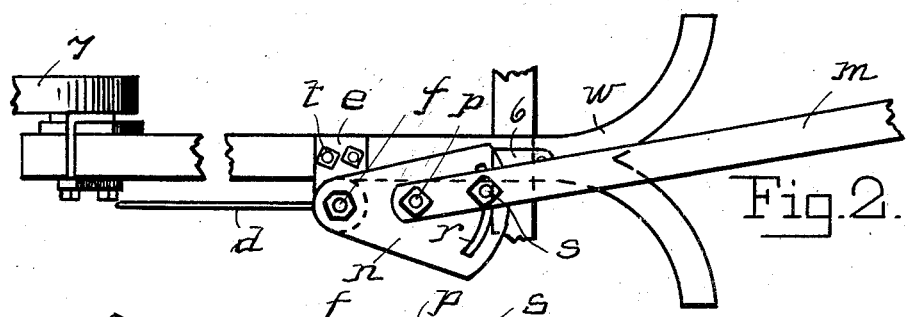
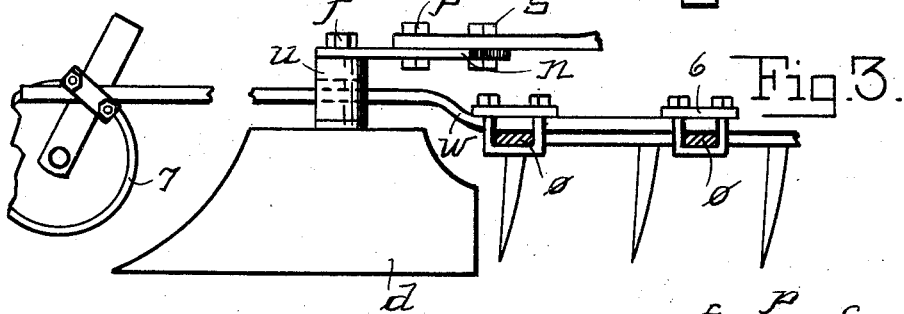
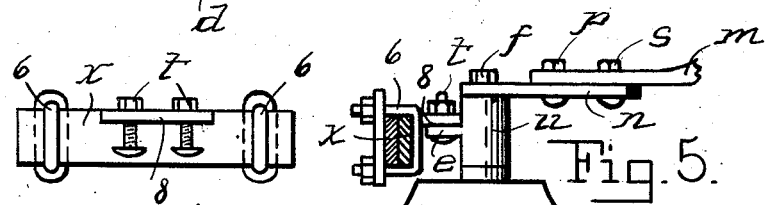
INVENTOR:
Christian A. Nielsen
By Richards & Geier
Attys.

May 13, 1930.  C. A. NIELSEN  1,757,974
CULTIVATOR STEERING ATTACHMENT
Filed March 20, 1926   2 Sheets-Sheet 2
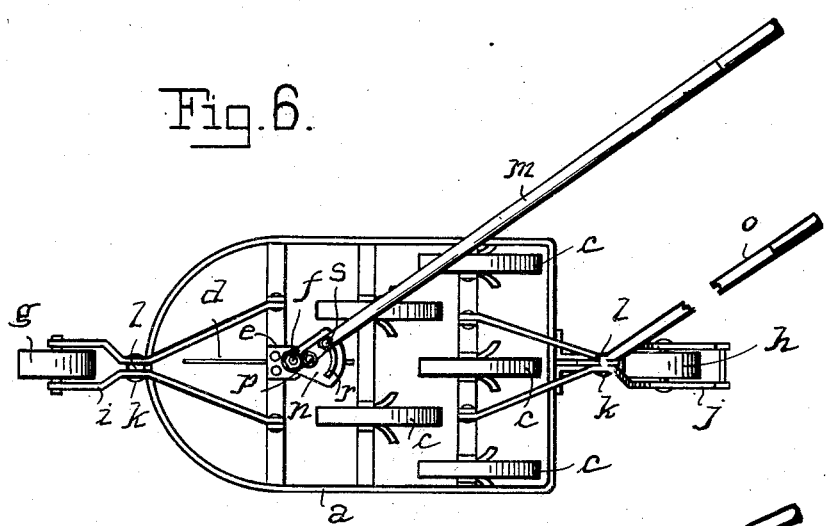
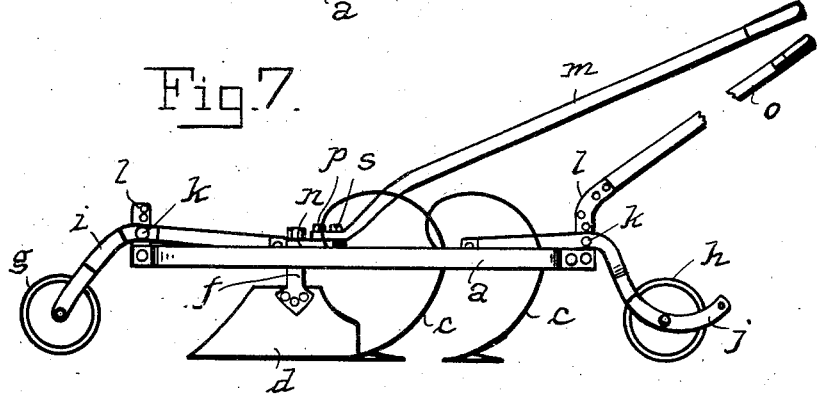
INVENTOR:
Christen A. Nielsen
By Richards & Geier
Attys.

Patented May 13, 1930

1,757,974

UNITED STATES PATENT OFFICE

CHRISTIAN ALBERT NIELSEN, OF AABYSKOV PR SKAARUP, DENMARK

CULTIVATOR-STEERING ATTACHMENT

Application filed March 20, 1926, Serial No. 96,121, and in Denmark April 2, 1925.

This invention relates to improvements in a deflector or steering plate for use on cultivating implements and has particular reference to a device for constantly outbalancing a diagonal pull from a draft animal advancing parallel but to one side of the implement in order that the implement shall advance, neither along the direction of the deflector, nor along the direction of the pulling chain, but along a direction lying between both.

Due to the diagonal cutting trajectory of the deflector, it is possible to pass the implement close to the trunks of trees and below their branches where the draft animal can not pass. The animal draws the implement by a chain which constantly remains diagonal to the trajectory of advance of the implement.

The deflector proper is pulled sideways through the soil, that is, not along its straight cutting line. The implement itself is guided out of the swerved direction by means of a long outwardly bent steering handle, though of course the implement may also be governed by brief changes in the oblique position of the deflector relative to the line of advance of the implement. In the drawings I have shown a form of construction in which:

Figure 1 is a side elevation of the deflector connected to an ordinary plough.

Figure 2 is a plan of the deflector connected to a harrow.

Figure 3 is the same in side elevation.

Figure 4 shows a connecting member for the deflector for a horse hoe.

Figure 5 shows the same with the deflector in side elevation.

Figure 6 shows the deflector mounted on a cultivating implement.

Figure 7 is a side elevation thereof.

The deflector $d$ has its pivot $f$ mounted in a bearing $u$ carrying a lug $e$. This lug is fixed by a bolt $t$ to the connecting piece $v$, $w$, or $x$, respectively intended for fixing the deflector $d$ to a plough, a harrow or a smoothing board. The lug $e$ is generally secured directly to one of the cross bars of the implement. In Figure 1 the bar $v$ is secured in well known manner to the plough beam $y$ by means of strap piece 5. The connecting piece $w$, in Figure 2, by means of which the deflector $d$ is fixed to a harrow, smoothing board or the like, is formed with a rear forked bar which has suitable holes receiving bolts for supporting straps 6 which secure the bar $w$ to the bars 4 of the implements. On the piece $w$ is suitably secured an adjustable wheel 7. The connecting piece $w$ as above described is especially intended for connecting the deflector $d$ to harrows, smoothing boards, and the like implements. In the form of construction shown in Figures 4 and 5, the connecting piece $x$ is formed from angle iron, the ends of one angle flange being cut away and leaving a fixing plate 8 for the lug $e$ on the bushing $u$. The piece $x$ is secured to the bar 9 of the horse hoe by means of straps 6 in known manner. The connecting piece $x$ may also be shaped so that the straps 6 are received in recesses in the fixing flange 8, which may then be of the same length as the other flange. On the cultivating implement shown in Figures 6 and 7 $a$ is the main frame of the implement, in which cross bars $b$ are disposed. On these cross bars a number of spring prongs are suitably attached. The foremost of the cross bars $b$ carries the deflector $d$. This deflector which engages in the soil edgewise can be made to lie within it more or less deep by raising and lowering the fore and back wheels $g$ and $h$ of the implement, these having suitable bearing in forks $i$ and $j$ respectively. The forks are movably pivoted to the cross bars $b$ and may be fixed in the desired position by means of bolts $k$, which either lead through holes in, or secure the fork bands $i$ and $j$ to adjusting pieces $l$ on the frame $a$ of the implements. The deflector $d$ is movable by means of a steering handle $m$ which as shown can be fixed at various angles to a plate $n$, by a bolt $p$. This plate is attached to and moves the bolt $f$ of the deflector. To the implement a steadying handle $o$ is fixed in suitable manner. By moving the steering handle $m$, the implement can be steered close to the trees without damaging them. In the plate $n$ a curved opening $r$ concentric with the bolt $p$, or if desired several holes may be formed, in which the steering handle $m$ can be fixed by a bolt *s* in every desired inclination with regard to the deflector *d*. When the implements are used on plain ground the deflector and rod can be removed, and a second steadying handle is fixed at the rear, when the implement may be used as an ordinary horse hoe. The various connecting pieces can be altered according to the implements they are intended for without departing from the spirit of my invention.

What is claimed is:

1. Apparatus for advancing farm implements on a parallel and to one side of the pulling trajectory of that of the draft power, comprising a deflector set to cut into the soil obliquely relative to the line of advance of the implement, a pivot for said deflector extending upwardly therefrom intermediate its ends, and a handle connected to said pivot for adjusting said deflector thereabout to different angles relative to said pulling trajectory.

2. Apparatus for advancing farm implements on a parallel and to one side of the pulling trajectory of that of the draft power, comprising a deflector set to cut into the soil obliquely relative to the line of advance of the implement, a pivot for said deflector extending upwardly therefrom intermediate its ends, a plate mounted upon said pivot and having a transverse slot therein, a handle pivoted to said plate, and means carried by the handle and engaging in said slot for securing the handle in various angular positions relative to said deflector.

In witness whereof I have hereunto set my hand.

CHRISTIAN ALBERT NIELSEN.